United States Patent
Du et al.

(10) Patent No.: US 10,272,842 B2
(45) Date of Patent: Apr. 30, 2019

(54) RUNNING BOARD DEVICE AND VEHICLE HAVING THE SAME

(71) Applicant: T-MAX (HANGZHOU) TECHNOLOGY CO., LTD, Hangzhou (CN)

(72) Inventors: Xinfa Du, Hangzhou (CN); Yiming Wang, Hangzhou (CN); Tao He, Hangzhou (CN); Qi Zhang, Hangzhou (CN); Yongyong Zhan, Hangzhou (CN); Xing Fan, Hangzhou (CN); Yuanyuan Zhou, Hangzhou (CN)

(73) Assignee: T-MAX (HANGZHOU) TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 15/587,492

(22) Filed: May 5, 2017

(65) Prior Publication Data
US 2018/0257572 A1    Sep. 13, 2018

(30) Foreign Application Priority Data

Mar. 13, 2017 (CN) .......................... 2017 1 0146430
Mar. 13, 2017 (CN) ...................... 2017 2 0240679 U

(51) Int. Cl.
  *B60R 3/00*    (2006.01)
  *B60R 3/02*    (2006.01)
  *B62D 37/02*   (2006.01)

(52) U.S. Cl.
  CPC ................ *B60R 3/02* (2013.01); *B60R 3/002* (2013.01)

(58) Field of Classification Search
  CPC ............ B60R 3/00; B60R 3/002; B60R 3/007; B60R 3/02; B62D 35/008; B62D 37/02
  See application file for complete search history.

(56) References Cited

U.S. PATENT DOCUMENTS 6,641,158 B2 *  11/2003  Leitner .................. B60R 3/002
                                                        105/443
7,441,790 B2 *  10/2008  Lechkun .................. B60R 3/02
                                                         280/163

(Continued)

FOREIGN PATENT DOCUMENTS

CN       101947935 A       1/2011
CN       105438079 A       3/2016

(Continued)

OTHER PUBLICATIONS

International Search Report and Written Opinion of the International Searching Authority for PCT International Application No. PCT/CN2017/116006 dated Feb. 11, 2018.

*Primary Examiner* — Bryan A Evans
(74) *Attorney, Agent, or Firm* — Howard & Howard Attorneys PLLC

(57) ABSTRACT

A running board device comprises a stationary running board; a retractable running board apparatus comprising a retractable mechanism moveable between a stretched position and a retracted position and a retractable running board mounted to the retractable mechanism, wherein at the stretched position, at least a part of the retractable running board stretches out below the stationary running board and beyond the stationary running board, and at the retracted position, the retractable running board is retracted into below the stationary running board.

8 Claims, 4 Drawing Sheets

(56) References Cited

U.S. PATENT DOCUMENTS

| | | | |
|---|---|---|---|
| 8,469,380 B2* | 6/2013 | Yang | B60R 3/02 |
| | | | 182/127 |
| 8,833,781 B2* | 9/2014 | Hayes | B60R 3/02 |
| | | | 280/163 |
| 2012/0025485 A1 | 2/2012 | Yang et al. | |

FOREIGN PATENT DOCUMENTS

| | | |
|---|---|---|
| CN | 205149674 U | 4/2016 |
| CN | 106915308 A | 7/2017 |
| CN | 206633916 U | 11/2017 |
| JP | H08156690 A | 6/1996 |

* cited by examiner

RUNNING BOARD DEVICE AND VEHICLE HAVING THE SAME

CROSS-REFERENCE TO RELATED APPLICATIONS

This application claims priority to and benefits of Chinese Patent Application Serial No. 201710146430.8, filed with the State Intellectual Property Office of P. R. China on Mar. 13, 2017, and Chinese Patent Application Serial No. 201720240679.0, filed with the State Intellectual Property Office of P. R. China on Mar. 13, 2017, the entire contents of which are incorporated herein by reference.

BACKGROUND OF THE INVENTION

1. Field of the Invention

The present disclosure relates to a field of vehicle technology, and more particularly to a running board device and a vehicle having the same.

2. Description of the Related Art

A vehicle running board is mounted under a vehicle door for people to get on or off the vehicle. From an ergonomic point of view, when a height of the running board relative to the ground is about 15 centimeters, it is the most convenient for people to get on or off the vehicle. However, considering vehicle trafficability, the mounting height of the running board should not be smaller than the minimum ground clearance of the vehicle. Therefore, the running board in the related art always has an irreconcilable contradiction between the vehicle trafficability and the convenience for people to get on or off the vehicle, and there exists a requirement for improvements.

In the related art, in order to make it convenient for people to get on or off the vehicle, a stationary running board is mounted under the vehicle door. However, for giving consideration to the trafficability at the same time, the stationary running board is much higher than the ground, so the utilization convenience is poor. To this end, a running board having a retractable function is provided in the related art. The running board is stretched for people to get on or off the vehicle when in use and is retracted below the vehicle body when not in use. However, the running board having the retractable function cannot play a protective role when being retracted, and especially cannot play the role of protecting a lateral face (such as the vehicle door) of the vehicle.

SUMMARY OF THE INVENTION

Embodiments of the present disclosure seek to solve at least one of the problems existing in the related art to at least some extent. To this end, a running board device is provided by a first aspect of the present disclosure, and the running board device has the good utilization convenience and the function of protecting the lateral face of the vehicle, especially the vehicle door.

A vehicle having the running board device is provided by a second aspect of the present disclosure.

The running board device according to the first aspect of embodiments of the present disclosure includes: a stationary running board; and a retractable running board apparatus including a retractable mechanism that is moveable between a stretched position and a retracted position and a retractable running board mounted to the retractable mechanism, in which at the stretched position, at least a part of the retractable running board stretches out below the stationary running board and beyond the stationary running board, and at the retracted position, the retractable running board is retracted into below the stationary running board.

In the running board device according to embodiments of the present disclosure, by disposing the retractable running board apparatus below the stationary running board, the retractable running board may be movable between the stretched position and the retracted position, hence the user may get on or off the vehicle and the user experience is improved. Moreover, as the stationary running board having a higher ground clearance is provided, when the retractable running board moves to the retracted position, the vehicle trafficability is improved. In addition, the stationary running board may play the role of protecting a lateral face of the vehicle—for example when a side impact happens, the impact force acts on the stationary running board, and a vehicle door and a vehicle body below the vehicle door are prevented from being damaged. Therefore, the running board device according to embodiments of the present disclosure is easy to use, and brings about good trafficability and good protection for the lateral face of the vehicle.

According to an embodiment of the present disclosure, a groove is disposed in a lower surface of the stationary running board, and at the retracted position, at least a part of the retractable running board is accommodated in the groove.

Optionally, at the retracted position, a front surface of the retractable running board is fitted to a front surface of the groove and a top face of the retractable running board is fitted to a top face of the groove.

Optionally, a top face of the groove is inclined upwardly along a direction from the inside to the outside.

According to an embodiment of the present disclosure, the retractable mechanism includes a mounting support; a running board support that is mounted to the running board support; and a limb assembly including a first limb and a second limb, in which a first end of the first limb is pivotally connected to the mounting support, a second end of the first limb is pivotally connected to the running board support, a first end of the second limb is pivotally connected to the mounting support, and a second end of the second limb is pivotally connected to the running board support.

According to an embodiment of the present disclosure, the retractable mechanism includes a mounting support; a running board support that is mounted to the running board support; and a limb assembly including a first limb, a second limb and a third limb, in which a first end of the first limb is pivotally connected to the mounting support, a second end of the first limb is pivotally connected to the running board support, a first end of the second limb is pivotally connected to the mounting support, a second end of the second limb is pivotally connected to a first end of the third limb, and a second end of the third limb is pivotally connected to the running board support.

According to an embodiment of the present disclosure, the retractable mechanism includes a mounting support; a running board support; a limb assembly including a first limb, a second limb and a third limb, in which a first end of the first limb is pivotally connected to the mounting support, a second end of the first limb is pivotally connected to the running board support, a first end of the second limb is pivotally connected to the mounting support, a first end of the third limb is pivotally connected to a second end of the second limb, and a second end of the third limb is pivotally connected to the running board support; a trajectory controlling plate mounted to the first limb and including a trajectory controlling groove; and a trajectory controlling shaft having a first end inserted into the trajectory controlling groove and movable in the trajectory controlling groove, and a second end mounted to at least one of the second limb and the third limb.

According to an embodiment of the present disclosure, the retractable mechanism includes a mounting support; a running board support; a limb assembly including a first limb, a second limb and a third limb, in which a first end of the first limb is pivotally connected to the mounting support, a second end of the first limb is pivotally connected to the running board support, a first end of the second limb is pivotally connected to the mounting support, a first end of the third limb is pivotally connected to a second end of the second limb, and a second end of the third limb is pivotally connected to the running board support; a trajectory controlling rod having a first end pivotally mounted to the first limb; and a trajectory controlling shaft having a first end pivotally connected to a second end of the trajectory controlling rod and a second end mounted to at least one of the second limb and the third limb.

The vehicle according to the second aspect of embodiments of the present disclosure includes: a vehicle body; a vehicle door; and the running board device according to the above embodiments, in which the stationary running board and the retractable mechanism are mounted to the vehicle body separately.

By adopting the running board device according to the first aspect of embodiments of the present disclosure, the vehicle according to embodiments of the present disclosure is convenient to use and has the function of protecting the lateral face of the vehicle especially the vehicle door.

BRIEF DESCRIPTION OF THE DRAWINGS

Other advantages of the invention will be readily appreciated as the same becomes better understood by reference to the following detailed description when considered in connection with the accompanying drawings, wherein.

REFERENCE NUMERALS

Figure 1:
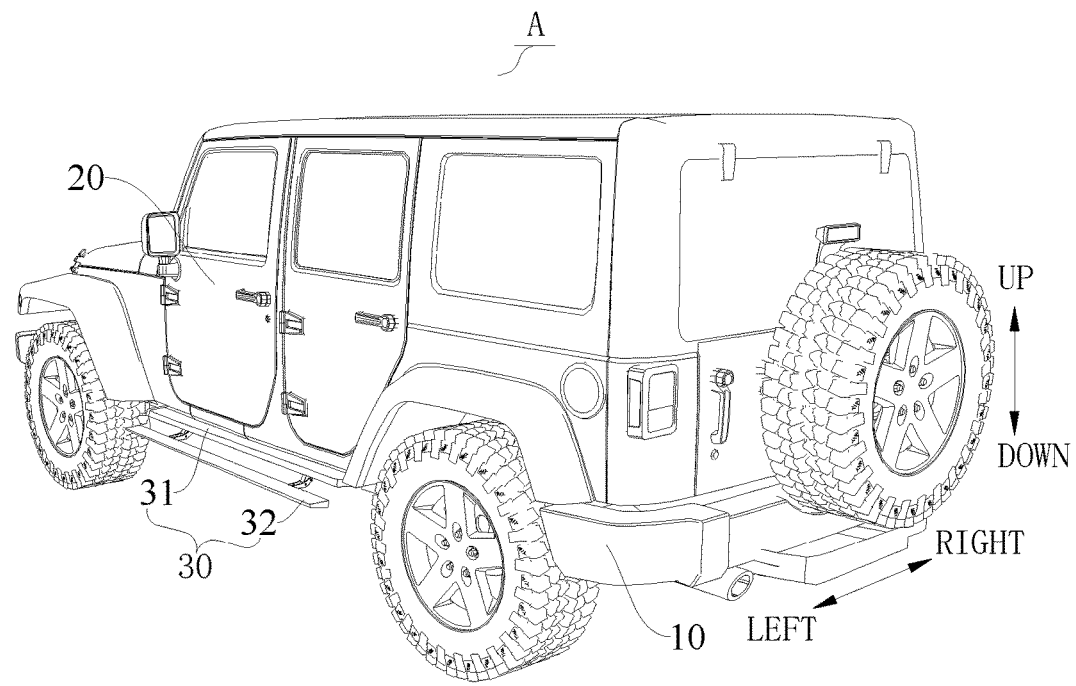
FIG. 1 is a schematic view of a vehicle according to an embodiment of the present disclosure, in which a retractable running board of a retractable running board apparatus is at a stretched position.

Vehicle A,
Vehicle body 10, mounting portion 11, vehicle door 20,
Running board device 30,
Stationary running board 31, groove 311,
Retractable running board apparatus 32, retractable running board 321,
Retractable mechanism 322,
Four-bar linkage 322a, five-bar linkage 322b, first six-bar linkage 322c, second six-bar linkage 322d,
Mounting support 3221, running board support 3222, limb assembly 3223,
First limb 32231, first end 32231a, second end 32231b, V-shaped groove 32231c, hole 32231d,
Second limb 32232, first end 32232a, second end 32232b,
Third limb 32233, first end 32233a, second end 32233b,
First connecting pin shaft 3223a, second connecting pin shaft 3223b, third connecting pin shaft 3223c, fourth connecting pin shaft 3223d, fifth connecting pin shaft 3223e, sixth connecting pin shaft 3223f,
Trajectory controlling plate 3224, trajectory controlling groove 3224a, trajectory controlling shaft 3225, trajectory controlling rod 3226, first through hole 3226a, second through hole 3226b.

DETAILED DESCRIPTION OF THE INVENTION

Reference will be made in detail to embodiments of the present disclosure. The embodiments described herein with reference to drawings are explanatory, illustrative, and used to generally understand the present disclosure. The same or similar elements and the elements having same or similar functions are denoted by like reference numerals throughout the descriptions. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

A vehicle A according to embodiments of the present disclosure is first described with reference to FIGS. 1-8.

Referring to FIGS. 1-4, the vehicle A according to embodiments of the present disclosure includes a vehicle body 10, a vehicle door 20 and a running board device 30.

The vehicle door 20 is mounted to the vehicle body 10 and is movable between an open position and a closed position. The running board device 30 is mounted to the vehicle body 10 and is adjacent to the vehicle door 20. The running board device 30 includes a stationary running board 31 and a retractable running board apparatus 32. The stationary running board 31 is mounted to a lateral face of the vehicle body 10 and located under the vehicle door 20, and extends outwards (for example, leftwards in FIG. 1) from the vehicle body 10. The vehicle body 10 has a mounting portion 11 located at a bottom thereof, and the retractable running board apparatus 32 is mounted to the mounting portion 11. The retractable running board apparatus 32 includes a retractable mechanism 322 that is moveable between a stretched position and a retracted position and a retractable running board 321 mounted to the retractable mechanism 322.

Figure 3:
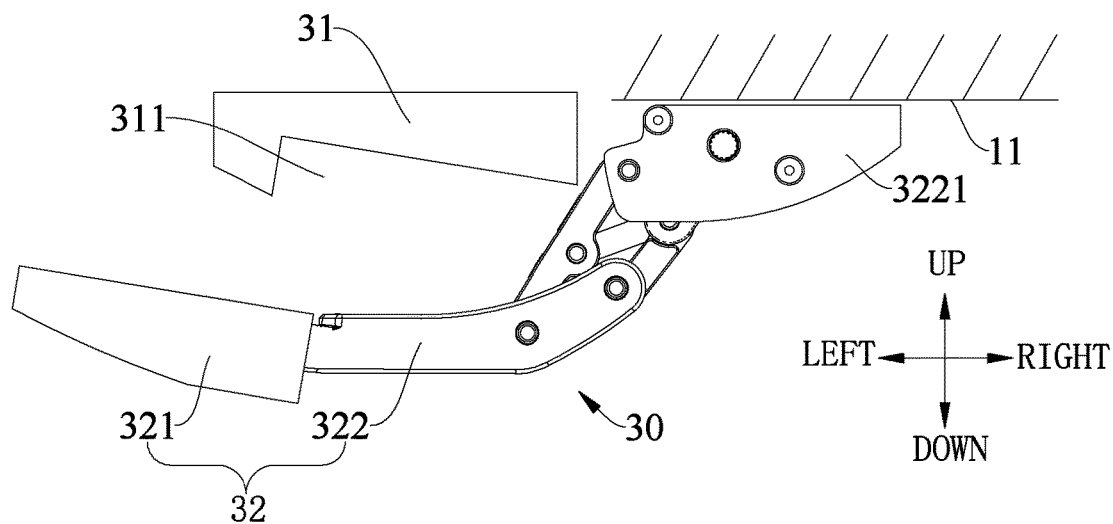
FIG. 3 is a schematic view of a running board device according to an embodiment of the present disclosure, in which a retractable running board of a retractable running board apparatus is at a stretched position.

As shown in FIG. 1 and FIG. 3, at the stretched position, at least a part of the retractable running board 321 stretches out below the stationary running board 31 and beyond the stationary running board 31; the stationary running board 31 and the retractable running board 321 form two steps of different heights, such that a user is easy to get on or off the vehicle.

Figure 2:
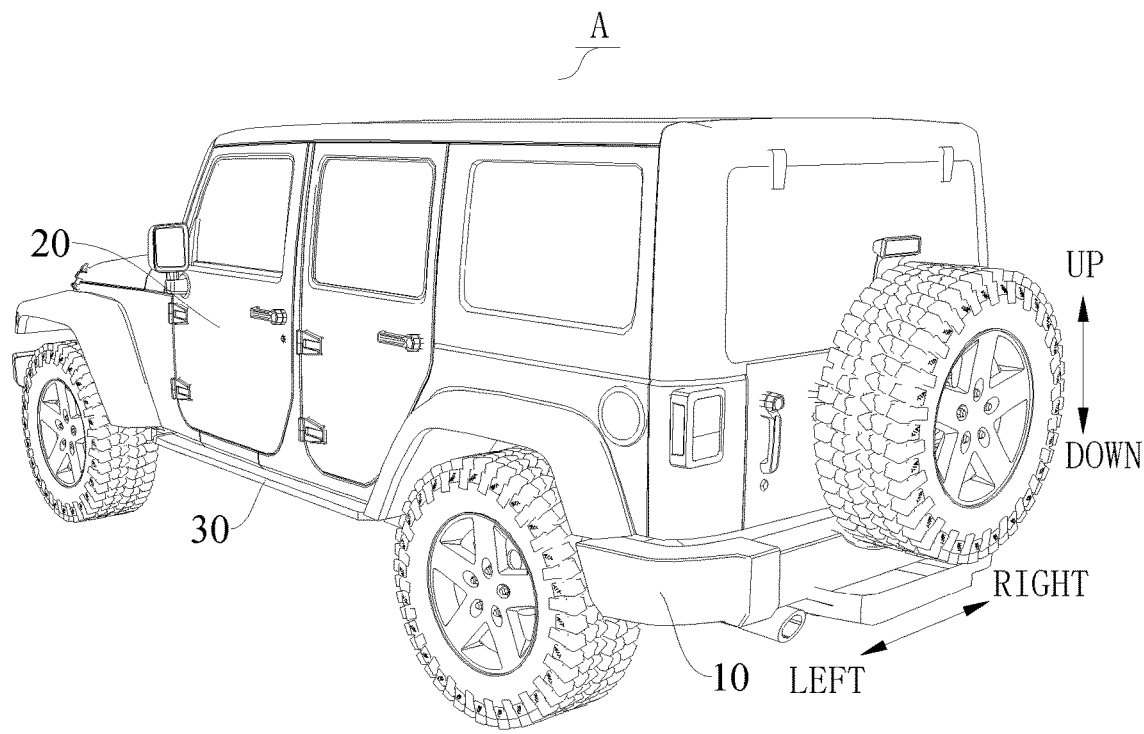
FIG. 2 is a schematic view of a vehicle according to an embodiment of the present disclosure, in which a retractable running board of a retractable running board apparatus is at a retracted position.
Figure 4:
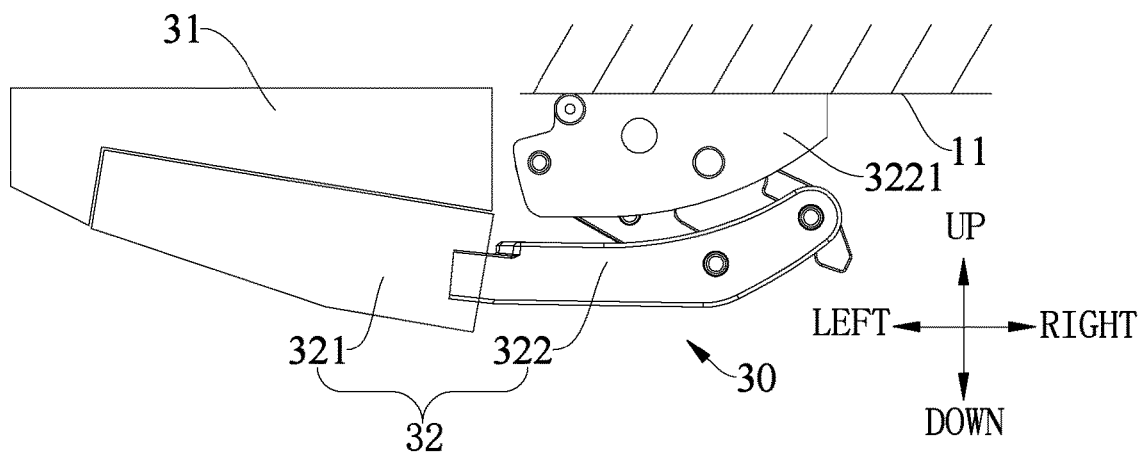
FIG. 4 is a schematic view of a running board device according to an embodiment of the present disclosure, in which a retractable running board of a retractable running board apparatus is at a retracted position.

As shown in FIG. 2 and FIG. 4, at the retracted position, the retractable running board 321 is retracted inwards below the stationary running board 31, so trafficability of the vehicle is not reduced. Even if the retractable running board 321 moves to the retracted position, the stationary running board 31 may function to protect the lateral face of the vehicle body 10 because it is fixed to the lateral face of the vehicle body 10.

In the running board device 30 according to embodiments of the present disclosure, by disposing, below the stationary running board 31, the retractable running board 321 that is driven by the retractable mechanism 322 to move between the stretched position and the retracted position, the user is convenient to get on or off the vehicle, the user experience is improved and the vehicle trafficability is not reduced. Moreover, the stationary running board 31 may play a role of protecting the lateral face (for example the vehicle door 20) of the vehicle A, preventing the vehicle door 20 and the like from being damaged.

By providing the running board device 30 having the stationary running board 31 and the retractable running board 321, the vehicle A according to embodiments of the present disclosure has the good utilization convenience, the good trafficability and the function of protecting the lateral face, especially the vehicle door 20, of the vehicle A.

The running board device 30 according to embodiments of the present disclosure will be described with reference to FIGS. 1-8.

As shown in FIGS. 1-4, the running board device 30 according to some embodiments of the present disclosure includes: the stationary running board 31 and the retractable running board apparatus 32. The stationary running board 31 and the retractable running board apparatus 32 are mounted to the vehicle body 10 separately; for example, the stationary running board 31 is mounted to a lateral portion of the vehicle body 10 below the vehicle door 20, and the retractable running board apparatus 32 is mounted below the vehicle body 10 (for example to a chassis of the vehicle).

In some embodiments, a groove 311 is disposed in a lower surface of the stationary running board 31. A top face of the groove 311 is inclined upwardly along a direction from the inside to the outside, and a front surface of the groove 311 is inclined outwardly along a direction from the top to the bottom. Herein, it should be understood that, the inside-outside direction refers to a left-right direction shown in FIG. 1. For example, the front surface of the groove 311 refers to a left lateral face of the groove 311 shown in FIG. 3.

As shown in FIG. 4, at the retracted position, a part of the retractable running board 321 is accommodated in the groove 311. It could be understood that, at the retracted position, the entire retractable running board 321 may be accommodated in the groove 311. A front surface (a left lateral face shown in FIG. 4) of the retractable running board 321 is fitted to the front surface of the groove 311, and a top face of the retractable running board 321 is fitted to the top face of the groove 311, such that at the retracted position, the retractable running board 321 may be better hidden below the vehicle body 10, and the vehicle trafficability is further improved.

In other words, the retractable running board 321 cooperates with the stationary running board 31 at the stretched position, constituting the running board for the user to get on the vehicle, and improving the convenience. At the retracted position, the retractable running board 321 is located an inner side of the stationary running board 31 and below the stationary running board 31, and the retractable running board 321 may not be exposed from the lateral face of the vehicle A, so the retractable running board 321 may not affect an appearance and the trafficability of the vehicle. Moreover, at the retracted position, the stationary running board 31 plays the role of protecting the lateral face of the vehicle A.

Optionally, the retractable mechanism 322 may include a four-bar linkage 322a, a five-bar linkage 322b, a first six-bar linkage 322c and a second six-bar linkage 322d.

Figure 5:
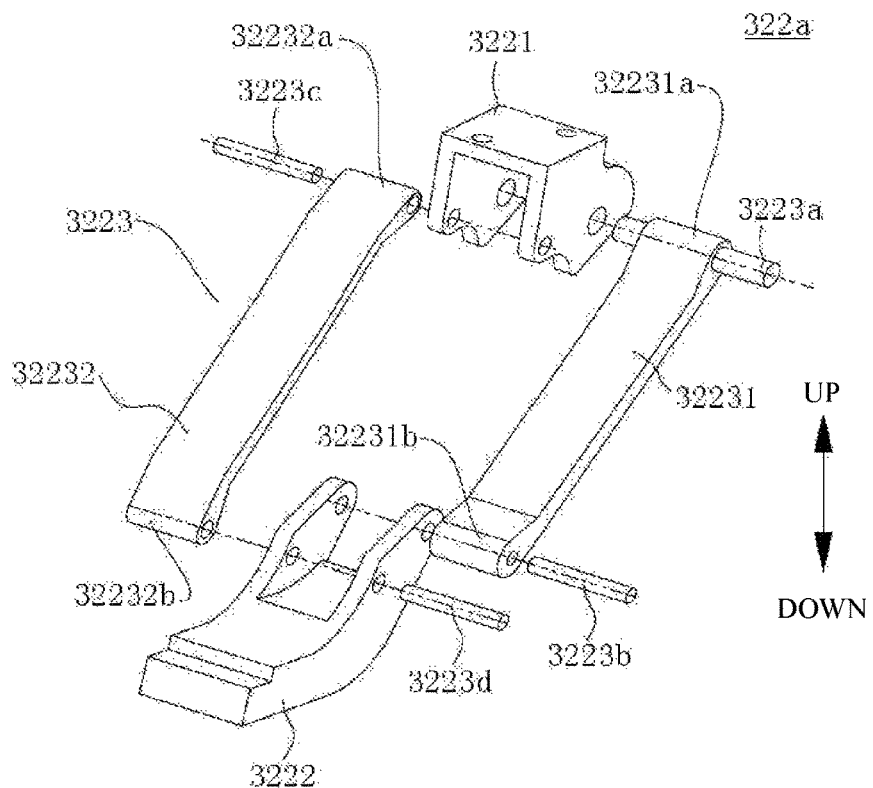
FIG. 5 shows an embodiment of a retractable mechanism of a retractable running board apparatus, in which the retractable mechanism includes a four-bar linkage.

For example, in the embodiment shown in FIG. 5, the retractable mechanism 322 includes the four-bar linkage 322a. The retractable mechanism 322 includes a mounting support 3221, a running board support 3222, and a limb assembly 3223 connected between the mounting support 3221 and the running board support 3222. The mounting support 3221 is mounted to the mounting portion 11. The retractable running board 321 is mounted to the running board support 3222.

The limb assembly 3223 includes a first limb 32231 and a second limb 32232. A first end 32231a of the first limb 32231 is pivotally connected to the mounting support 3221 through a first connecting pin shaft 3223a, and a second end 32231b of the first limb 32231 is pivotally connected to the running board support 3222 through a second connecting pin shaft 3223b. Herein the "first end 32231a" refers to an upper end of the first limb 32231 shown in FIG. 5, and the "second end 32231b" refers to a lower end of the first limb 32231 shown in FIG. 5.

Similarly, a first end 32232a of the second limb 32232 is pivotally connected to the mounting support 3221 through a third connecting pin shaft 3223c, and a second end 32232b of the second limb 32232 is pivotally connected to the running board support 3222 through a fourth connecting pin shaft 3223d. At least one of the first limb 32231 and the second limb 32232 may be connected to an electric motor (not shown in FIG. 5). Therefore, the electric motor drives at least one of the first limb 32231 and the second limb 32232 to pivot, and thus at least one of the first limb 32231 and the second limb 32232 drives the retractable running board 321 to stretch or retract through the running board support 3222.

Figure 6:
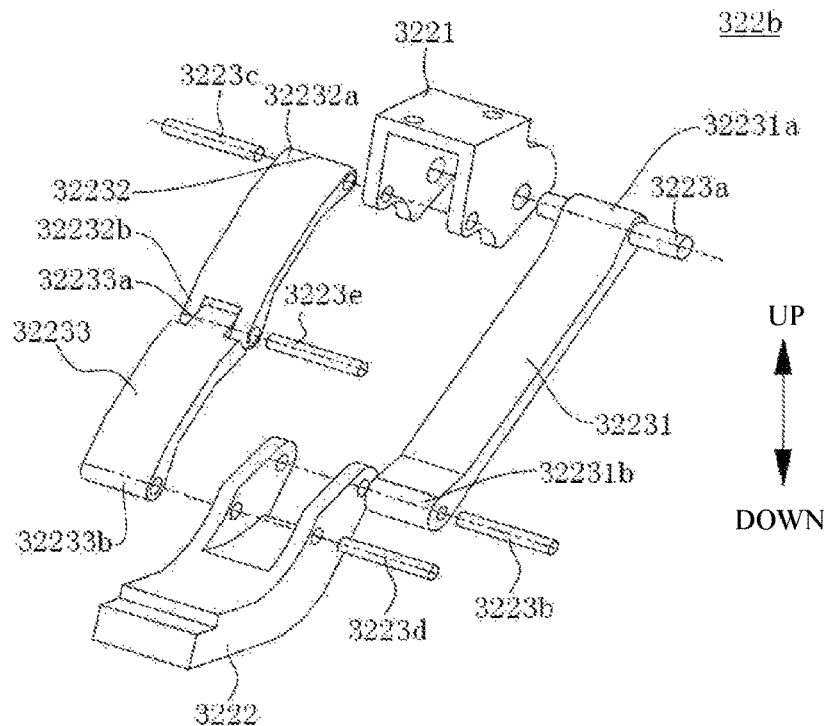
FIG. 6 shows another embodiment of a retractable mechanism of a retractable running board apparatus, in which the retractable mechanism includes a five-bar linkage.

In the embodiment shown in FIG. 6, the retractable mechanism 322 includes the five-bar linkage 322b. The retractable mechanism 322 includes the mounting support 3221, the running board support 3222, and the limb assembly 3223 connected between the mounting support 3221 and the running board support 3222. The retractable running board 321 is mounted to the running board support 3222.

More specifically, the limb assembly 3223 includes the first limb 32231, the second limb 32232 and a third limb 32233. The first limb 32231 has the first end 32231a and the second end 32231b. Herein the "first end 32231a" refers to an upper end of the first limb 32231 shown in FIG. 6, and the "second end 32231b" refers to a lower end of the first limb 32231 shown in FIG. 6. The first end 32231a of the first limb 32231 is pivotally connected to the mounting support 3221 through the first connecting pin shaft 3223a, and the second end 32231b of the first limb 32231 is pivotally connected to the running board support 3222 through the second connecting pin shaft 3223b.

The second limb 32232 includes the first end 32232a and the second end 32232b, and the first end 32232a of the second limb 32232 is pivotally connected to the mounting support 3221 through the third connecting pin shaft 3223c. The third limb 32233 includes a first end 32233a and a second end 32233b. The second end 32232b of the second limb 32232 is pivotally connected to the first end 32233a of the third limb 32233 through a fifth connecting pin shaft 3223e, and the second end 32233b of the third limb 32233 is pivotally connected to the running board support 3222 through the fourth connecting pin shaft 3223d.

At least one of the first limb 32231 and the second limb 32232 may be connected to an electric motor (not shown in FIG. 6). Therefore, the electric motor drives at least one of the first limb 32231 and the second limb 32232 to pivot, and thus at least one of the first limb 32231 and the second limb 32232 drives the retractable running board 321 to stretch or retract through the running board support 3222. In the retractable mechanism 322 adopting the five-bar linkage, the stability and accuracy of the retractable mechanism 322 during a stretching and retracting process may be improved.

In some specific embodiments of the present disclosure, the retractable mechanism 322 includes the first six-bar linkage 322c and includes the mounting support 3221, the running board support 3222, the limb assembly 3223, a trajectory controlling plate 3224, and a trajectory controlling shaft 3225.

The limb assembly 3223 includes the first limb 32231, the second limb 32232 and the third limb 32233. The first end 32231a of the first limb 32231 is pivotally connected to the mounting support 3221, and the second end 32231b of the first limb 32231 is pivotally connected to the running board support 3222. The first end 32232a of the second limb 32232 is pivotally connected to the mounting support 3221. The first end 32233a of the third limb 32233 is pivotally connected to the second end 32232b of the second limb 32232, and the second end 32233b of the third limb 32233 is pivotally connected to the running board support 3222. The trajectory controlling plate 3224 is mounted to the first limb 32231 and includes a trajectory controlling groove 3224a. A first end of the trajectory controlling shaft 3225 is inserted into the trajectory controlling groove 3224a and is movable in the trajectory controlling groove 3224a; a second end of the trajectory controlling shaft 3225 is mounted to at least one of the second limb 32232 and the third limb 32233.

The trajectory controlling plate 3224 is mounted to one of first limb 32231, the second limb 32232 and the third limb 32233 and is provided with the trajectory controlling groove 3224a. The first end of the trajectory controlling shaft 3225 is inserted into the trajectory controlling groove 3224a and is movable in the trajectory controlling groove 3224a. The second end of the trajectory controlling shaft 3225 is mounted to a limb opposite to the one limb which the trajectory controlling plate is mounted to, in a transverse direction (a left-right direction shown in FIG. 7).

Figure 7:
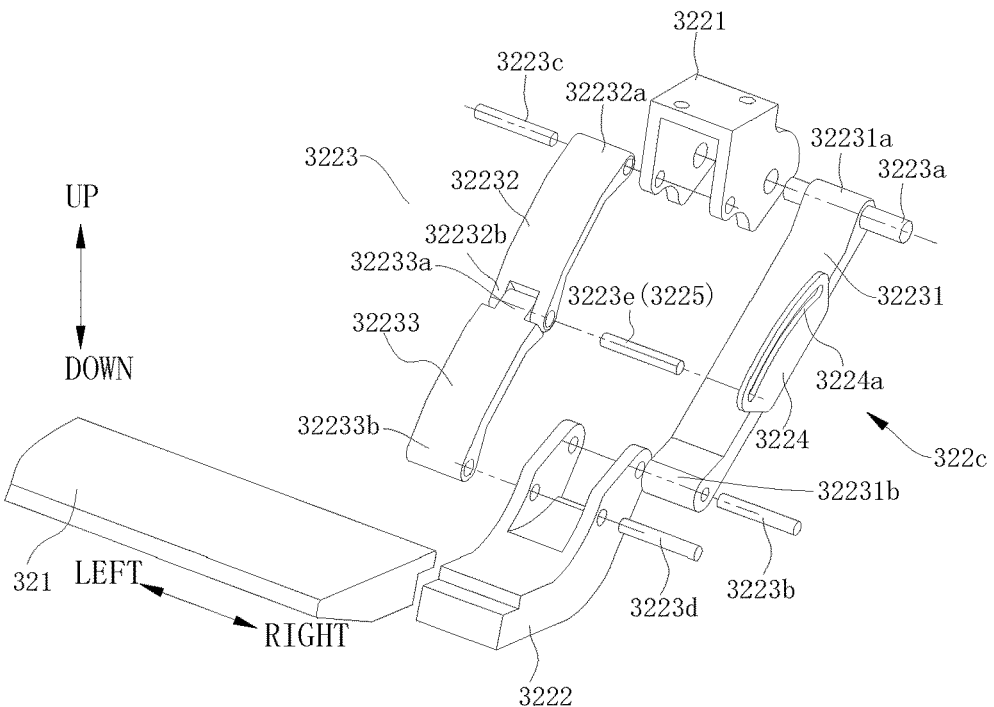
FIG. 7 shows another embodiment of a retractable mechanism of a retractable running board apparatus, in which the retractable mechanism includes of a six-bar linkage.

In some specific embodiments of the present disclosure, as shown in FIG. 7, the trajectory controlling plate 3224 is mounted to the first limb 32231. The first end of the trajectory controlling shaft 3225 is inserted into the trajectory controlling groove 3224a and is movable in the trajectory controlling groove 3224a; the second end of the trajectory controlling shaft 3225 is connected to the limb opposite to the first limb 32231 in the transverse direction.

The first end 32231a (an upper end shown in FIG. 7) of the first limb 32231 is pivotally connected to the mounting support 3221 through the first connecting pin shaft 3223a, and the second end 32231b (a lower end shown in FIG. 7) of the first limb 32231 is pivotally connected to the running board support 3222 through the second connecting pin shaft 3223b. More specifically, the first connecting pin shaft 3223a runs through a hole in the upper end of the first limb 32231 and a hole in the mounting support 3221, such that the upper end of the first limb 32231 is pivotally connected to the mounting support 3221. The second connecting pin shaft 3223b runs through a hole in the lower end of the first limb 32231 and a hole in the running board support 3222, such that the lower end of the first limb 32231 is pivotally connected to the running board support 3222.

The first end 32232a (an upper end shown in FIG. 7) of the second limb 32232 is pivotally connected to the mounting support 3221 through the third connecting pin shaft 3223c, and the second end 32232b (a lower end shown in FIG. 7) of the second limb 32232 is pivotally connected to the first end 32233a (an upper end shown in FIG. 7) of the third limb 32233 through the fifth connecting pin shaft 3223e. More specifically, the third connecting pin shaft 3223c runs through a hole in the upper end of the second limb 32232 and a hole in the mounting support 3221, such that the upper end of the second limb 32232 is pivotally connected to the mounting support 3221. The fifth connecting pin shaft 3223e runs through a hole in the lower end of the second limb 32232 and a hole in the upper end of the third limb 32233, such that the second limb 32232 is pivotally connected to the third limb 32233.

A lower end of the third limb 32233 is pivotally connected to the running board support 3222 through the fourth connecting pin shaft 3223d. More specifically, the fourth connecting pin shaft 3223d runs through a hole in the lower end of the third limb 32233 and a hole in the running board support 3222, such that the lower end of the third limb 32233 is pivotally connected to the running board support 3222.

In the embodiment shown in FIG. 7, the fifth connecting pin shaft 3223e used to connect the lower end of the second limb 32232 and the upper end of the third limb 32233 is the trajectory controlling shaft 3225. In other words, the trajectory controlling shaft 3225 and the fifth connecting pin shaft 3223e are the same shaft. A first end of the fifth connecting pin shaft 3223e is inserted into the trajectory controlling groove 3224a and is movable in the trajectory controlling groove 3224a; a second end of the fifth connecting pin shaft 3223e runs through the hole in the lower end of the second limb 32232 and the hole in the upper end of the third limb 32233, such that the lower end of the second limb 32232 is pivotally connected to the upper end of the third limb 32233.

However, it should be understood that, the present disclosure is not limited thereby, and the trajectory controlling shaft 3225 may be a separate shaft, which for example may be mounted to the second limb 32232 or the third limb 32233.

As shown in FIG. 7, the trajectory controlling groove 3224a may be a closed curved groove formed within the trajectory controlling plate 3224. The trajectory controlling plate 3224 may be integrated with the first limb 32231, for example the trajectory controlling plate 3224 may be welded to the first limb 32231, or the trajectory controlling plate 3224 may be a part of the first limb 32231. Optionally, the trajectory controlling plate 3224 may be mounted to the first limb 32231 by bolts.

In the retractable mechanism 322 according to embodiments of the present disclosure, by the trajectory controlling groove 3224a and the trajectory controlling shaft 3225 inserted therein, a movement trajectory of the running board support 3222 (or the retractable running board 321 mounted thereon) may be controlled, and a travel of the running board support 3222 is increased. By changing the position or shape of the trajectory controlling groove 3224a, or the position of the trajectory controlling shaft 3225, or their combinations, the movement trajectory of the running board support 3222 may be changed easily and accurately, such that the retractable mechanism 322 is mounted flexibly, which for example may be mounted to a middle part of the chassis of the vehicle A, and the applicability is good.

In some optional embodiments of the present disclosure, the second end of the trajectory controlling shaft 3225 is mounted to the second limb 32232, which for example is welded to or mounted by bolts to the second limb 32232. In some other optional embodiments of the present disclosure, the second end of the trajectory controlling shaft 3225 is mounted to the third limb 32233, which for example is welded to or mounted by bolts to the third limb 32233.

In some embodiments of the present disclosure, the trajectory controlling plate 3224 may be mounted to the second limb 32232, and the second end of the trajectory controlling shaft 3225 is mounted to the first limb 32231. In some other embodiments of the present disclosure, the trajectory controlling plate 3224 may be mounted to the third limb 32233, and the second end of the trajectory controlling shaft 3225 is mounted to the first limb 32231. In brief, when the trajectory controlling plate 3224 is mounted to the second limb 32232 or the third limb 32233, the second end of the trajectory controlling shaft 3225 is mounted to the first limb 32231.

In some other specific embodiments of the present disclosure, the retractable mechanism 322 includes may be the second six-bar linkage 322d and includes the mounting support 3221, the running board support 3222, the limb assembly 3223, a trajectory controlling rod 3226, and the trajectory controlling shaft 3225.

The limb assembly 3223 includes the first limb 32231, the second limb 32232 and the third limb 32233. The first end 32231a of the first limb 32231 is pivotally connected to the mounting support 3221, and the second end 32231b of the first limb 32231 is pivotally connected to the running board support 3222. The first end 32232a of the second limb 32232 is pivotally connected to the mounting support 3221. The first end 32233a of the third limb 32233 is pivotally connected to the second end 32232b of the second limb 32232, and the second end 32233b of the third limb 32233 is pivotally connected to the running board support 3222. A first end of the trajectory controlling rod 3226 is pivotally mounted to the first limb 32231. The first end of the trajectory controlling shaft 3225 is pivotally connected to a second end of the trajectory controlling rod 3226; the second end of the trajectory controlling shaft 3225 is mounted to at least one of the second limb 32232 and the third limb 32233.

Figure 8:
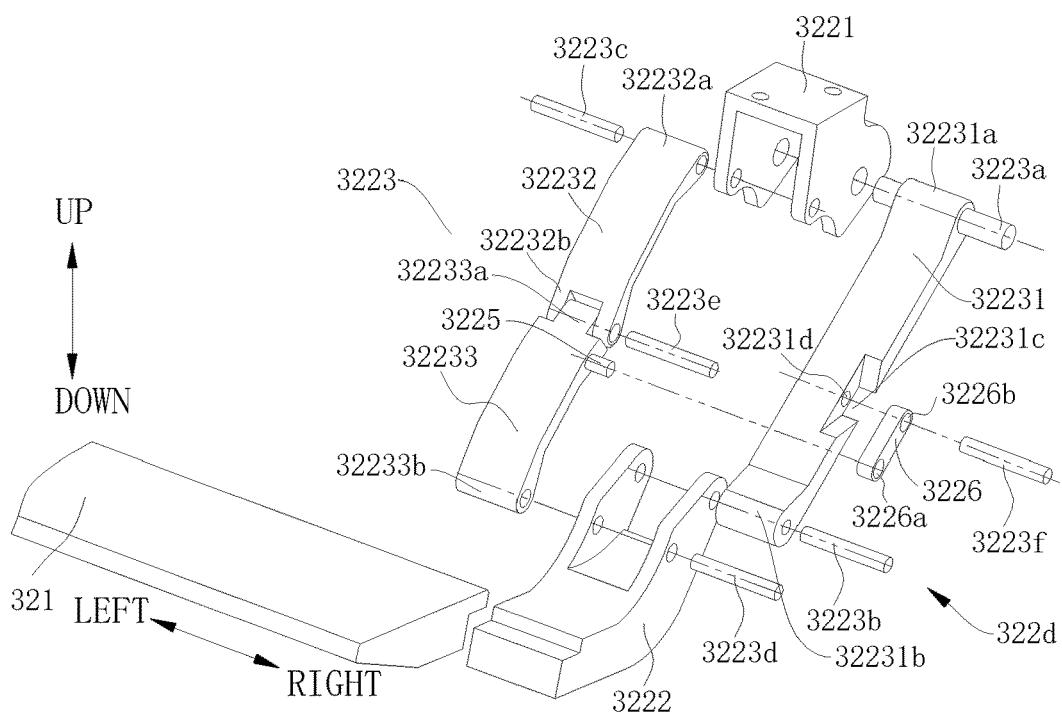
FIG. 8 shows another embodiment of a retractable mechanism of a retractable running board apparatus, in which the retractable mechanism includes another six-bar linkage.

In the embodiment shown in FIG. 8, the trajectory controlling rod 3226 is shaped as a long strip, a lateral face thereof generally includes a long circle, and the trajectory controlling rod 3226 is provided with a first through hole 3226a and a second through hole 3226b at two ends thereof respectively. The first end of the trajectory controlling rod 3226 is rotatably mounted to the first limb 32231 through a sixth connecting pin shaft 3223f, the first end of the trajectory controlling shaft 3225 is rotatably inserted into the first through hole 3226a in the second end of the trajectory controlling rod 3226, and the second end of the trajectory controlling shaft 3225 is mounted to the third limb 32233. More specifically, the second limb 32232 and the third limb 32233 are connected through the fifth connecting pin shaft 3223e, and the trajectory controlling shaft 3225 is welded to or mounted by bolts to the third limb 32233.

As shown in FIG. 8, the first limb 32231 is provided with a V-shaped groove 32231c in an outer lateral face, the first limb 32231 is provided with a hole 32231 at the position of the V-shaped groove 32231c, and the first end of the trajectory controlling rod 3226 is connected to the first limb 32231 in the V-shaped groove 32231c by the sixth connecting pin shaft 3223f which runs through the through hole 3226b and is inserted into the hole 32231d. By providing the V-shaped groove 32231c, the rotation of the trajectory controlling rod 3226 may be facilitated. Certainly, the present disclosure is not limited thereby, and for example the first end of the trajectory controlling rod 3226 may be directly connected to the lateral face of the first limb 32231 through the sixth connecting pin shaft 3223f.

When the vehicle door 20 is open, the retractable mechanism 322 moves to the stretched position, passengers may get on the vehicle by the retractable running board 321 and the stationary running board 31. When the vehicle door 20 is closed, the retractable mechanism 322 moves to the retracted position. The movement trajectory of the running board support 3222 (or the retractable running board 321) may be easily and accurately controlled by the trajectory controlling rod 3226 and the trajectory controlling shaft 3225.

In the running board device according to embodiments of the present disclosure, the stationary running board and the retractable running board 321 are movable between the stretched position and the retracted position are provided, which not only improves the convenience for the user to get on the vehicle by using the running board, but also brings about the good vehicle trafficability, and furthermore, the stationary running board may protect the lateral face of the vehicle.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A vehicle comprising:
a vehicle body and a vehicle door; and
a running board device comprising:
a stationary running board; and
a retractable running board apparatus comprising a retractable mechanism that is moveable between a stretched position and a retracted position and a retractable running board mounted to the retractable mechanism,
wherein at the stretched position, at least a part of the retractable running board stretches out below the stationary running board and beyond the stationary running board, and at the retracted position, the retractable running board is retracted into below the stationary running board,
wherein the retractable mechanism comprises:
a mounting support;
a running board support;
a limb assembly comprising a first limb, a second limb and a third limb, wherein a first end of the first limb is pivotally connected to the mounting support, a second end of the first limb is pivotally connected to the running board support, a first end of the second limb is pivotally connected to the mounting support, a first end of the third limb is pivotally connected to a second end of the second limb, and a second end of the third limb is pivotally connected to the running board support;
a trajectory controlling plate mounted to the first limb and comprising a trajectory controlling groove; and
a trajectory controlling shaft having a first end inserted into the trajectory controlling groove and movable in the trajectory controlling groove, and a second end mounted to at least one of the second limb and the third limb,
wherein the stationary running board and the retractable mechanism are mounted to the vehicle body separately.

2. A vehicle comprising:
a vehicle body and a vehicle door; and
a running board device comprising:
a stationary running board; and
a retractable running board apparatus comprising a retractable mechanism that is moveable between a stretched position and a retracted position and a retractable running board mounted to the retractable mechanism,
wherein at the stretched position, at least a part of the retractable running board stretches out below the stationary running board and beyond the stationary running board, and at the retracted position, the retractable running board is retracted into below the stationary running board,
wherein the retractable mechanism comprises:
a mounting support;
a running board support;
a limb assembly comprising a first limb, a second limb and a third limb, in which a first end of the first limb is pivotally connected to the mounting support, a second end of the first limb is pivotally connected to the running board support, a first end of the second limb is pivotally connected to the mounting support, a first end of the third limb is pivotally connected to a second end of the second limb, and a second end of the third limb is pivotally connected to the running board support;
a trajectory controlling rod having a first end pivotally mounted to the first limb; and
a trajectory controlling shaft having a first end pivotally connected to a second end of the trajectory controlling rod and a second end mounted to at least one of the second limb and the third limb,
wherein the stationary running board and the retractable mechanism are mounted to the vehicle body separately.

3. The vehicle as set forth in claim 1, wherein a groove is disposed in a lower surface of the stationary running board, and at the retracted position, at least a part of the retractable running board is accommodated in the groove.

4. The vehicle as set forth in claim 3, wherein at the retracted position, a front surface of the retractable running board is fitted to a front surface of the groove, and a top face of the retractable running board is fitted to a top face of the groove.

5. The vehicle as set forth in claim 3, wherein a top face of the groove is inclined upwardly along a direction from the inside to the outside.

6. The vehicle as set forth in claim 2, wherein a groove is disposed in a lower surface of the stationary running board, and at the retracted position, at least a part of the retractable running board is accommodated in the groove.

7. The vehicle as set forth in claim 6, wherein at the retracted position, a front surface of the retractable running board is fitted to a front surface of the groove, and a top face of the retractable running board is fitted to a top face of the groove.

8. The vehicle as set forth in claim 6, wherein a top face of the groove is inclined upwardly along a direction from the inside to the outside.

* * * * *